United States Patent [19]

Weiss

[11] Patent Number: 5,661,301
[45] Date of Patent: Aug. 26, 1997

[54] SPECTROSCOPY AND MAPPING OF ATOMS, MOLECULES AND SURFACE FEATURES VIA DIFFERENCE FREQUENCY GENERATION WITH A SCANNING TUNNELING MICROSCOPE OR RELATED INSTRUMENTS

[75] Inventor: Paul S. Weiss, State College, Pa.

[73] Assignee: The Penn State Research Foundation, University Park, Pa.

[21] Appl. No.: 598,045

[22] Filed: Feb. 7, 1996

[51] Int. Cl.$^6$ .................................................. G01N 23/225
[52] U.S. Cl. ........................................... 250/307; 250/306
[58] Field of Search ..................................... 250/306, 307

[56] References Cited

U.S. PATENT DOCUMENTS

| | | | |
|---|---|---|---|
| 5,198,667 | 3/1993 | Glembocki et al. | 250/306 |
| 5,268,573 | 12/1993 | Weiss et al. | 250/306 |

OTHER PUBLICATIONS

"Laser-frequency mixing in the junction of a scanning tunneling microscope", L. Arnold et al., *Appl. Phys. Lett.*, vol. 51, No. 11, 14 Sep. 1987, pp. 786–788.
"Nonlinear Alternating-Current Tunneling Microscopy", Greg P. Kochanski, *Physical Review Letters*, vol. 62, No. 19, 8 May 1989, pp. 2285–2288.
"Nonlinear Alternating-Current Tunneling Microscopy", Greg P. Kochanski, AT&T pre-print dated Aug. 17, 1988 published *Physical Review Letters*, vol. 62, No. 19, 8 May 1989, pp. 2285–2288.
"Optical Interactions in the Junction of a Scanning Tunneling Microscope", Y. Kuk et al., *Physical Review Letters*, vol. 65, No. 4, 23 Jul. 1990; pp. 456–459.
"Scanning tunneling microscopy of photoexcited carriers at the Si(001) surface", D.G. Cahill & R.J. Hamers, *J. Vac. Sci. Technol. B*, 9 (2), Mar./Apr. 1991, pp. 564–567.
"Laser-Driven Scanning Tunneling Microscope", M. Völcker et al., *Physical Review Letters*, vol. 66, No. 13, 1 Apr. 1991, pp. 1717–1720.

"Scanning tunneling microscopy at microwave frequencies", W. Seifert et al., *Ultramicroscopy*, 42–44, 1992, pp. 379–387.
"Scanning tunneling microscopy at microwave frequencies", W. Seifert et al., pre-print Korrigierte Version, Nov. 6, 1991, pp. 1–26.
"Scanning surface harmonic microscopy: Scanning probe microscopy based on microwave field-induced harmonic generation", B. Michel et al., *Rev. Sci. Instrum.*, 63 (9), Sep. 1992, pp. 4080–4085.
"A New Mechanism for Laser-Frequency Mixing in a Scanning Tunneling Microscope", C. Sammet et al., Max-Planck-Institut für Quantenoptik, pre-print 1994, pp. 1–12; published in book *Photons and Local Probes*, Kluwer Academic Publishers (Dordrecht, 1995), pp. 257–268.
"Laser-frequency mixing using the scanning tunneling microscope", L. Arnold et al., *J. Vac. Sci. Technol. A.*, vol. 6, No. 2, Mar./Apr. 1988, pp. 465–469.
"Generation of microwave radiation in the tunneling junction of a scanning tunneling microscope", W. Kreiger et al., *Physical Review B*, vol. 41, No. 14, 15 May 1990, pp. 10229–10232.
"Ultrafast time resolution in scanned probe microscopies", R.J. Hamers & S.G. Cahill, *Appl. Phys. Lett.*, 57 (19), 5 Nov. 1990, pp. 2031–2033.
"Ultrafast time resolution in scanned probe microscopies; Surface photovoltage on Si(111)–(7×7)", R.J. Hamers & D. G. Cahill, *J. Vac.Sci. Technol.*, B9 (2), Mar./Apr. 1991, pp. 514–518.

(List continued on next page.)

*Primary Examiner*—Jack I. Berman
*Attorney, Agent, or Firm*—Thomas J. Monahan

[57] ABSTRACT

In spectroscopic mode, the energy levels of an atom, molecule or surface feature are determined by scanning laser frequencies and/or microwave frequencies. Enhanced radiation in the microwave or optical frequency range is detected and the detected spectra characterize the energy levels. In the analytical mode, the laser and/or microwave frequencies are optimized to detect the presence of an atom, molecule or surface feature.

26 Claims, 4 Drawing Sheets

OTHER PUBLICATIONS

"Laser–assisted scanning tunneling microscopy", M. Völcker et al., *J. Vac. Sci. Technol.*, B 9 (2), Mar./Apr. 1991, pp. 541–544.

"Ultrafast scanning probe microscopy", S. Weiss et al., *Appl. Phys. Lett.* 63 (18), 1 Nov. 1993, pp. 2567–2569.

"Photon Emission at Molecular Resolution Induced by a Scanning Tunneling Microscope", R. Berndt et al., *Science*, vol. 262, 26 Nov. 1993, pp. 1425–1427.

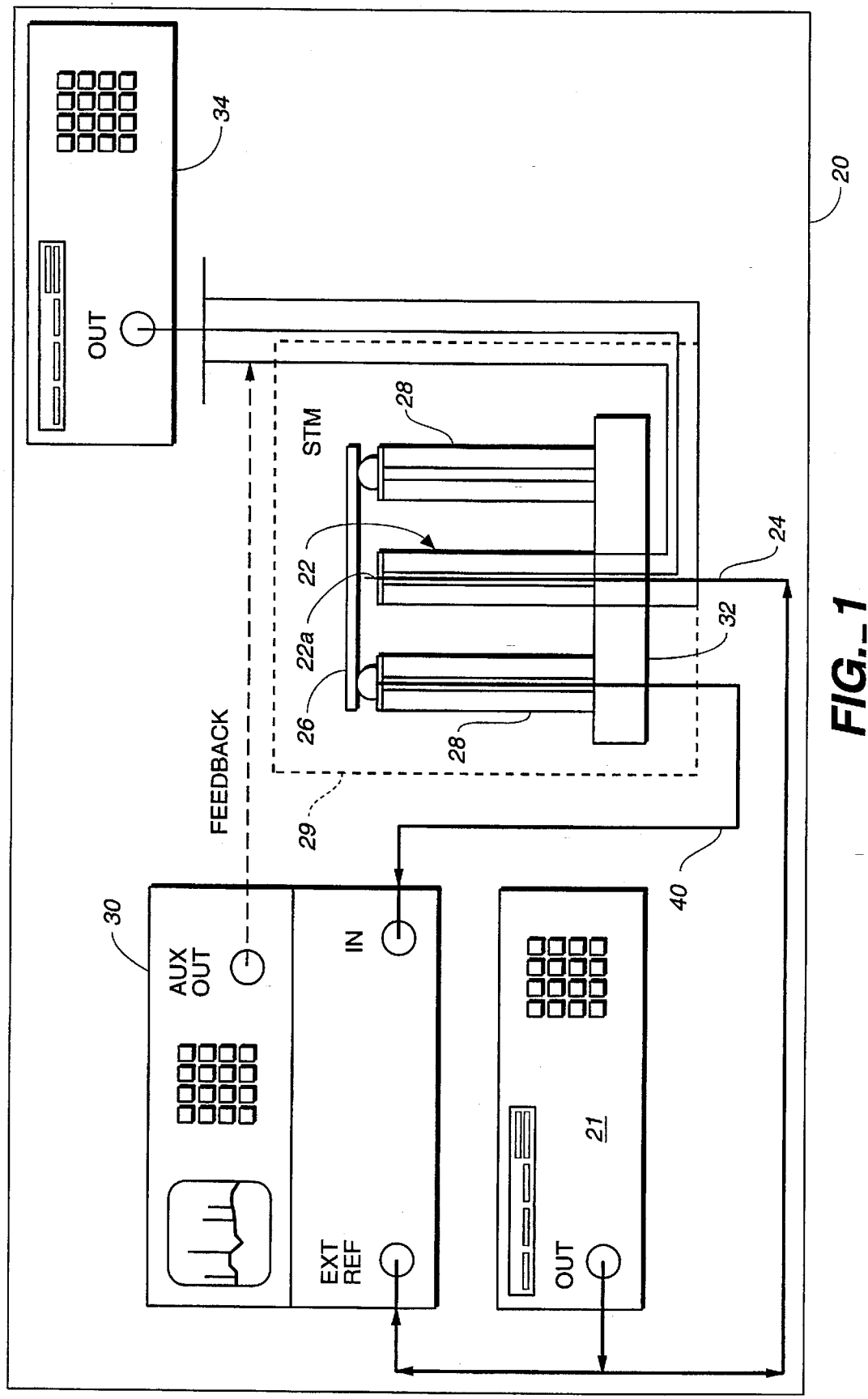
FIG._1

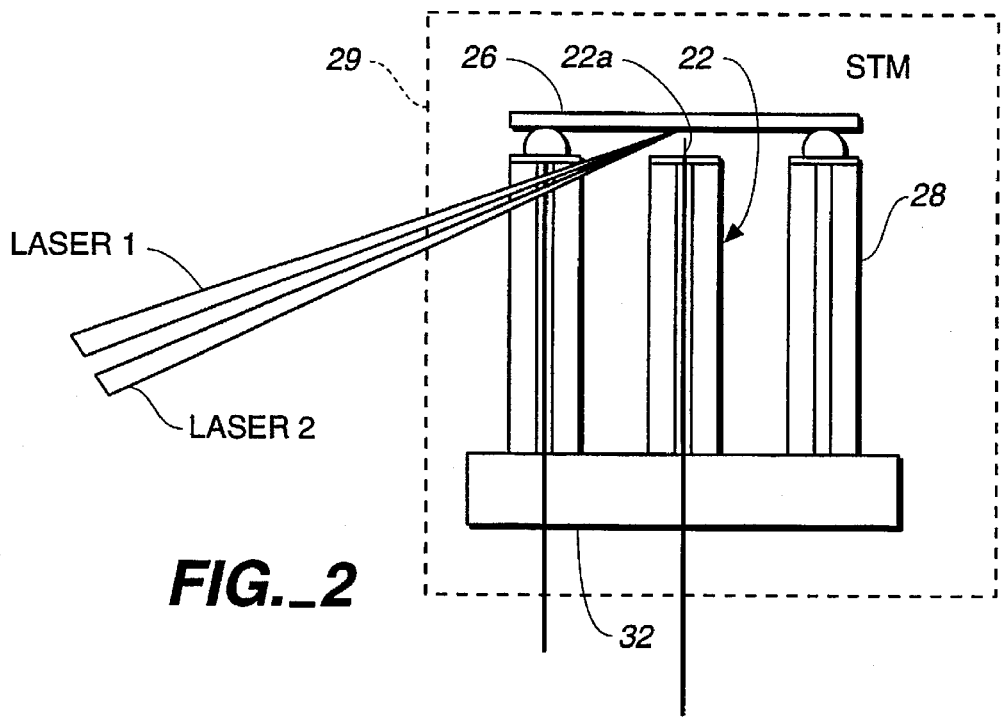
FIG._2
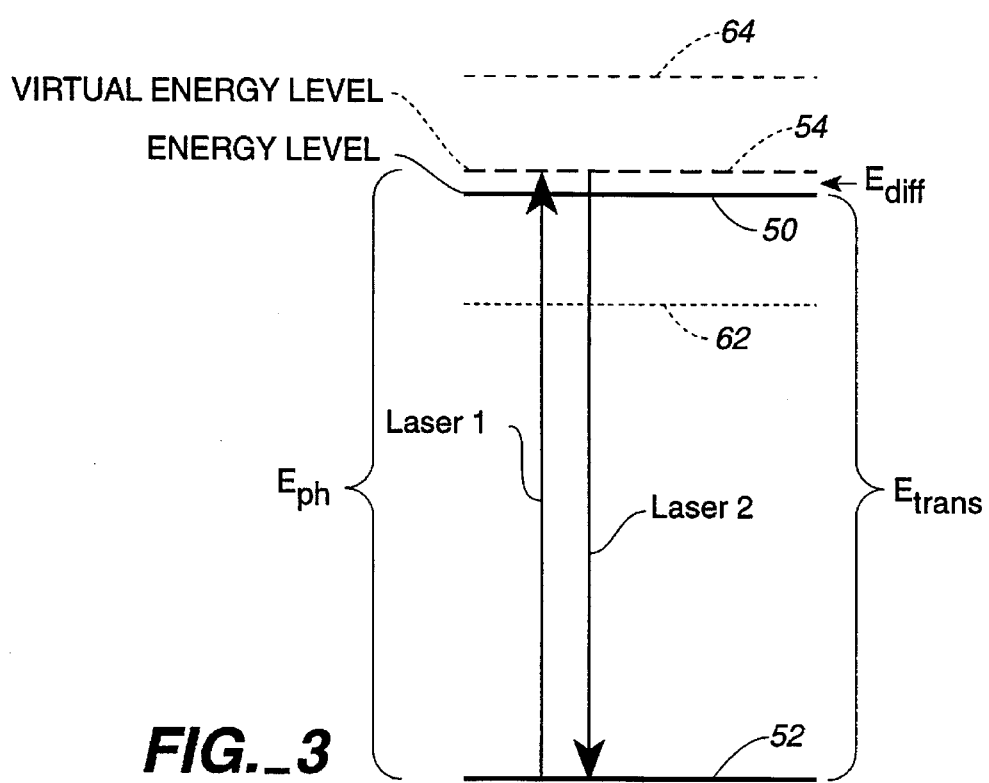
FIG._3

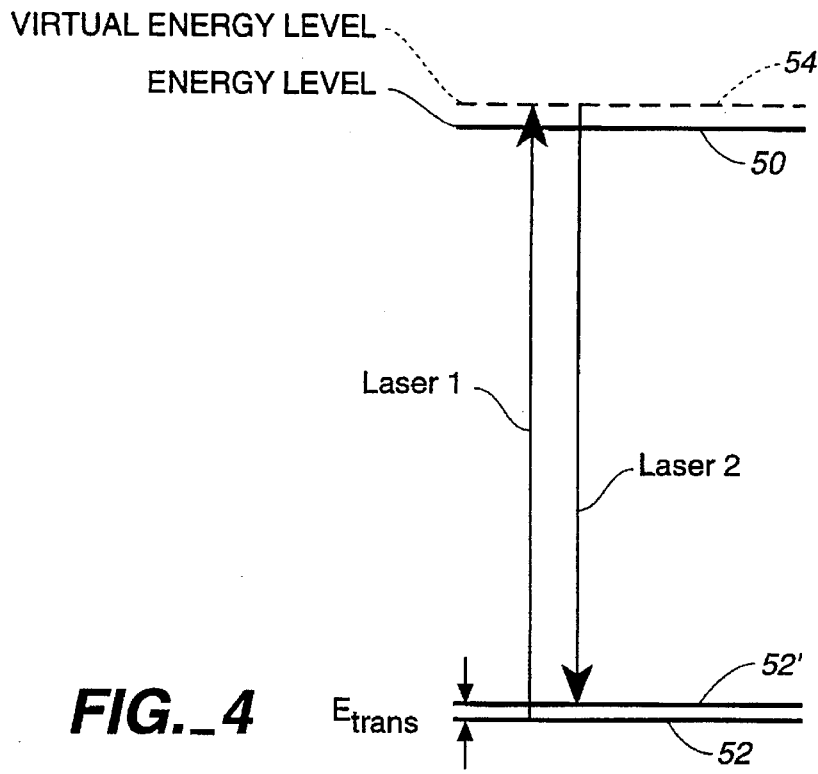
FIG._4
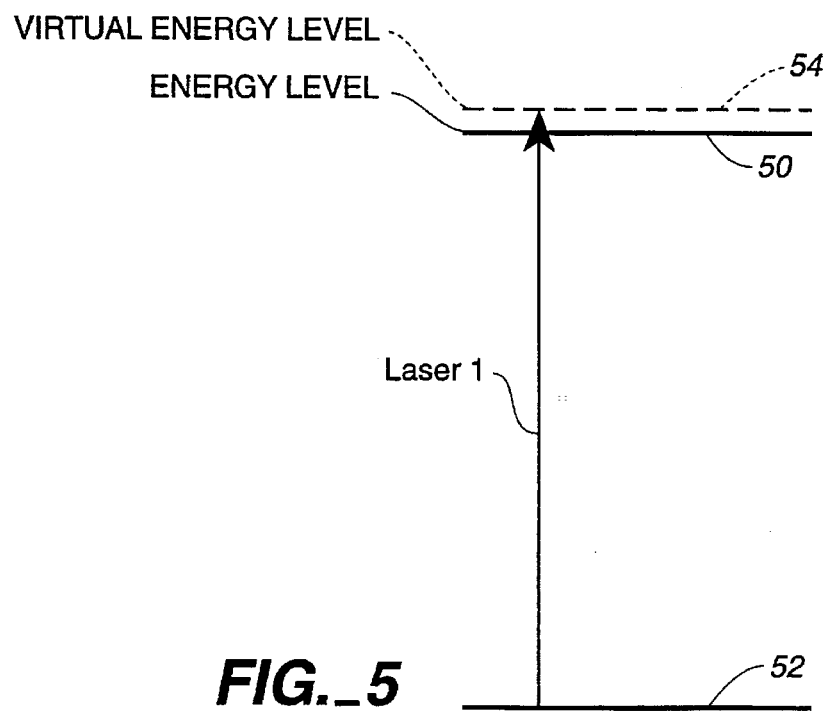
FIG._5

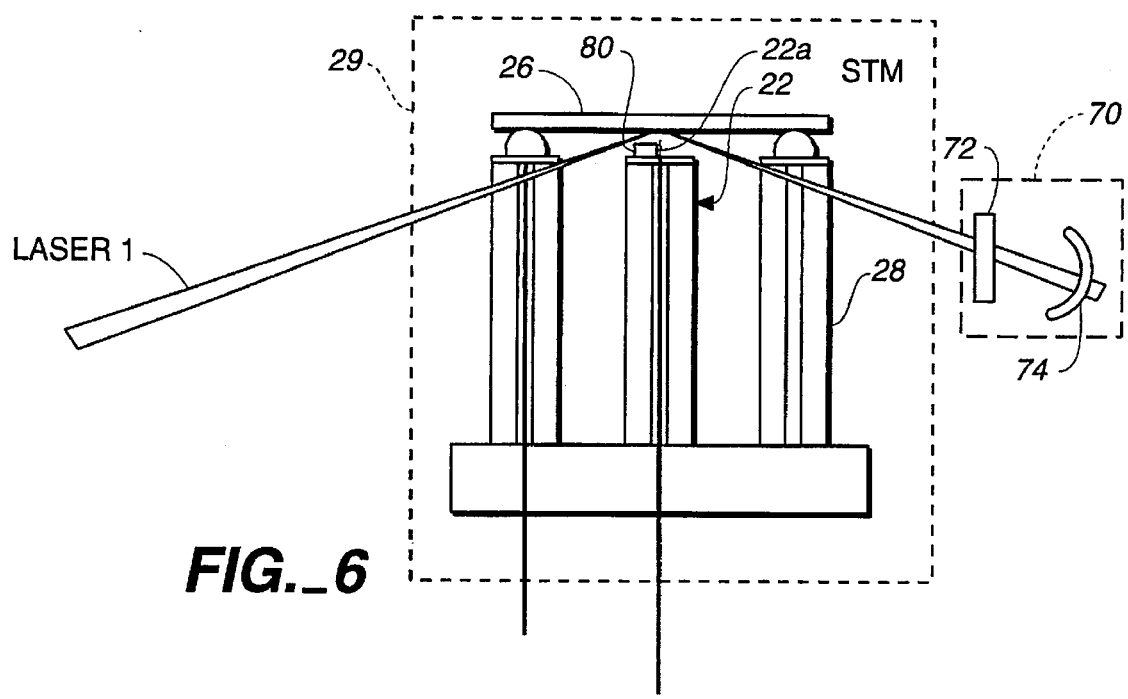
FIG._6
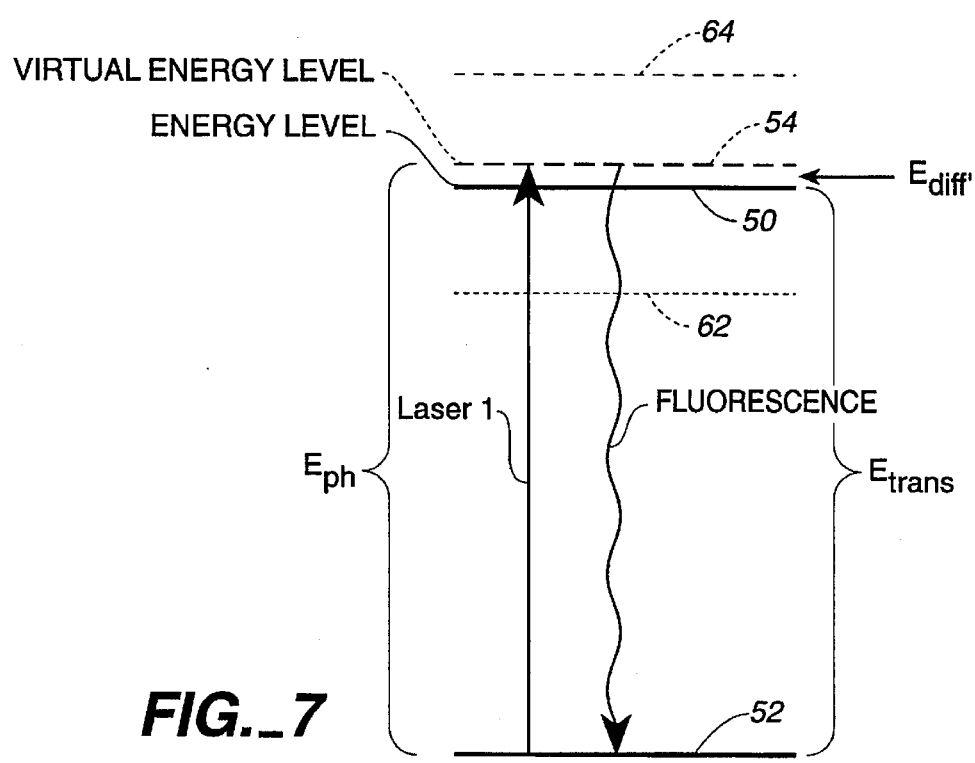
FIG._7

SPECTROSCOPY AND MAPPING OF ATOMS, MOLECULES AND SURFACE FEATURES VIA DIFFERENCE FREQUENCY GENERATION WITH A SCANNING TUNNELING MICROSCOPE OR RELATED INSTRUMENTS

BACKGROUND OF THE INVENTION

This invention relates in general to techniques for non-destructive characterization, identification and mapping of atoms and/or molecules adsorbed on solid surfaces, and other surface features. In particular, it relates to such techniques employing difference frequency generation with a scanning tunneling microscope or similar type of instrument.

With the advent of instruments such as the scanning tunneling microscope (STM), it is now possible to investigate the structure, spectra and dynamics of atoms, molecules and surfaces at the atomic or molecular level. For examples of non-linear alternating current STM techniques, please see U.S. Pat. Nos. 5,268,573 and 5,281,814.

In the two patents referenced above, a microwave sweep oscillator is used to apply an AC signal across a STM and a current or voltage passing between the electrodes of the STM is measured by a microwave spectrum/network analyzer. The frequency of the signal applied by the oscillator is swept across the spectrum and the optimum frequency of the spectrum is determined so that an improved image of the surface of a sample is obtained. The spectrum of a known substance is recorded and used as a signature for identifying components of an unknown substance by comparison. When the amplitude of the AC signal applied is increased, a sudden change in response indicates a threshold. The scheme is used for indicating charge dissipation characteristics or dynamic information of an electrochemical reaction.

Scanning tunneling microscopy and atomic force microscopy can indicate the presence of a single feature, but typically cannot determine the feature's identity. In the area of molecular structure determination, two techniques are most common. The first is X-ray diffraction, which requires crystals of the material to be studied, which is a severe limitation. The second is nuclear magnetic resonance, which remains complicated for large molecules and also requires a sample containing many molecules. It is therefore desirable to provide a system where single atoms, molecules or sub-micron surface features can be characterized and identified.

SUMMARY OF THE INVENTION

While laser-frequency mixing in the junction of an STM has been published in the literature, the potential applications suggested by the authors are for imaging surfaces or simply for generation of the desired difference frequencies. See "Laser-Frequency Mixing in the Junction of a Scanning Tunneling Microscope," by Arnold et al., *Appl. Phys. Lett.*, vol. 51, No. 11, Sep. 14, 1987, pages 786–788 and "Laser-Driven Scanning Tunneling Microscope," by Volcker, *Phys. Rev. Lett.*, Vol. 66, No. 13, Apr. 1, 1991, pages 1717–1720. This invention is based on the observation that laser-frequency mixing in the Junction of a scanning tunneling microscope can be used for the non-destructive characterization and identification of single atoms or molecules adsorbed on solid surfaces or other surface features. An example of a surface feature is a reconstructed region of a surface.

One aspect of the invention is directed towards a method for determining one or more energy levels of an atom, molecule or surface feature, comprising the steps of directing at least one laser beam at a surface where said atom, molecule or surface feature is located; placing the tip of a scanning tunneling microscope in the vicinity of the surface; tuning the frequency of the at least one laser beam through a range of frequencies; and monitoring an enhancement of the difference frequency between the transition energy and energy of photons in the beam by means of the scanning tunneling microscope.

Another aspect of the invention is directed towards a method for detecting the presence of an atom, molecule or surface feature on the surface, comprising the steps of directing at least one laser beam at the surface; placing the tip of a scanning tunneling microscope in the vicinity of the surface; and optimizing the frequency of the at least one laser beam and the frequency of detection of the scanning tunneling microscope to detect at one or more frequencies characteristic of said atom, molecule or surface feature.

This invention is also based on the observation that the frequency mixing can be accomplished by the interaction of a laser beam and microwaves at a surface to cause photon emission from an atom, molecule or surface feature present on the surface. Thus another aspect of the invention is directed towards a method for determining one or more energy levels of an atom, molecule or surface feature comprising the steps of directing at least one laser beam at a surface where said atom, molecule or surface feature is located; supplying microwaves to the surface; tuning the frequency of the at least one laser beam through a range of frequencies; and detecting photon emission from the surface for determining one or more energy levels or states of an atom, molecule or surface feature. In some embodiments, it may also be desirable to tune the frequency or frequencies of the microwaves through a range of frequencies. For the different aspects of this invention described herein, the photon(s) emitted by the atom, molecule or surface feature may have a frequency or frequencies in the optical, microwave or other ranges.

Yet another aspect of the invention is directed towards a method for detecting the presence of an atom, molecule or surface feature on a surface, comprising the steps of directing a laser beam at a surface where said atom, molecule or surface feature may be located; supplying microwaves towards said surface; optimizing the frequency or frequencies of the at least one laser beam for detecting at one or more frequencies characteristic of said atom, molecule or surface feature; and detecting photon emission from the surface for determining presence of said atom, molecule or surface feature. In some embodiments, it may also be desirable to tune the frequency or frequencies of the microwaves through a range of frequencies.

Yet another aspect of the invention is directed towards an apparatus for non-destructive identification and/or characterization of an atom, molecule or surface feature, comprising a laser source directing at least one laser beam at a surface where said atom, molecule or surface feature may be located, said source being tunable over a substantially continuous frequency range, a scanning tunneling microscope having a tip in the vicinity of the surface; and means connected to the tip for measuring over a spectrum of frequencies in the range of 1 to 30 GHz for non-destructive identification and/or characterization of an atom, molecule or surface feature.

Still another aspect of the invention is directed towards an apparatus for non-destructive identification and/or characterization of an atom, molecule or surface feature, comprising a laser source directing at least one laser beam at a surface where said atom, molecule or surface feature may be located; a scanning tunneling microscope having a tip in the vicinity of the surface supplying microwaves of one or more frequencies to said surface; and means for detecting photon emission from the surface for non-destructive identification and/or characterization of said atom, molecule or surface feature.

BRIEF DESCRIPTION OF THE DRAWINGS

FIG. 1 is a schematic diagram of a tunable alternating current scanning tunneling microscope (ACSTM) to illustrate the preferred embodiment of the invention.

FIG. 2 is a schematic diagram of a portion of the ACSTM of FIG. 1 and two or more lasers to illustrate the preferred embodiment of the invention.

FIGS. 3–5 are energy level diagrams which, together with FIGS. 1 and 2, illustrate the operation of the preferred embodiment of the invention where the STM is used for detecting an enhancement of a difference frequency signal between the laser frequency or frequencies and an energy level of an atom, molecule or surface feature to be detected.

FIG. 6 is a schematic diagram of a portion of the STM of FIG. 1 and at least one laser and an optical detector such as a spectrometer to illustrate another aspect of the preferred embodiment of the invention.

FIG. 7 is an energy level diagram illustrating the operation of the aspect of the invention in FIG. 6 where the STM is used to supply microwaves to an atom, molecule or surface feature which, together with the laser, may cause fluorescence from the atom, molecule or surface feature. Such fluorescence is detected by means of an optical detector such as a spectrometer.

For convenience in description, identical parts and components are labelled by the same numerals in the different Figures of this application.

DETAILED DESCRIPTION OF THE PREFERRED EMBODIMENT

This invention is based on the observation that when the energy ($E_{ph}$) of a monochromatic source of photons (such as a laser) is tuned near to and not exactly at the transition energy ($E_{trans}$) of an adsorbate immediately under the tip of an STM, ACSTM, NSOM (i.e. near field optical microscope) or similar instrument, enhanced radiation will be generated at the difference frequency $E_{diff}$ of the transition energy and the energy of the external photon source. That is, the energy $E_{diff}$ of the enhanced radiation is related to the photon energy $E_{ph}$ and the transition energy $E_{trans}$ by the following equations:

$$E_{diff} = E_{ph} - E_{trans}; \text{ or}$$

$$E_{diff} = E_{trans} - E_{ph}.$$

Where such enhanced radiation is in a microwave frequency range, the enhanced emission may be detected as a modulation of the tunneling current between the tip of the STM and the surface on which the adsorbate rests. This spectroscopy is different from Raman spectroscopy in that the enhanced emission is localized to a tiny area (e.g. of submicron size) of the surface in the vicinity of the tip of the STM, and that such local difference frequency enhanced radiation can be probed by measuring the tunneling current modulation. This technique is particularly advantageous since it probes only a tiny region in the immediate vicinity of the tip. In such manner, it is possible to detect and analyze the spectrum of a single atom, or of part of a large molecule or molecular complex on a surface.

In the scheme described above, the STM is primarily used to measure the tunneling current modulation. In a different mode of operation, the STM can be used instead to inject and supply microwave energy in conjunction with photons from the laser.

FIG. 1 is a schematic diagram of a system 20 including a beetle-style high frequency STM suitable for recording tunneling current spectra using spectrum/network analyzers or for supplying microwaves to a sample on a surface to illustrate the preferred embodiment of the invention. As shown in FIG. 1, tip 22a is placed close to but spaced apart (by vacuum, a gas or a fluid) from a sample 26 which is placed on top of the piezoelectric tube assembly 28 comprising one or more peripheral piezoelectric tubes.

A signal line inside assembly 28 is connected to microwave spectrum/network analyzers 30. Alternatively, devices such as lock-in-amplifiers can be used in lieu of spectrum/network analyzers; such and other variations are within the scope of the invention. The position of the sample 26 over probe tip 22a is controlled by changing the length of piezoelectric tube 22 by applying a voltage to it as controlled by piezocontrollers 34. Controllers 34 receive from analyzers 30 a signal to be used for feedback. The same effect can be achieved by moving the sample instead of the probe, where the voltage signal from piezocontrollers 34 is applied to one or more of the peripheral piezoelectric tubes in assembly 28 in order to change its or their length(s). To simplify the description, the operation of the invention is described in terms of moving only the tube 22 and probe 22a. It is understood that the same effect can be achieved by moving the sample; all such variations are within he scope of the invention.

In operation, the microwave sweep oscillator 21 applies an AC signal to tip 22a and analyzers 30 apply typically the reference voltage such as a virtual ground to assembly 28 in electrical contact with the sample 26. In an operational mode known as the transmission mode of operation, the current or voltage between electrodes 22, 28 is monitored by analyzers 30 which derive a feedback signal for controllers 34. In a constant current mode, this feedback signal is applied to the piezo controllers 34 for moving the tip 22a away from or towards the sample 26 in order to maintain a constant signal amplitude between electrode 22 and assembly 28. In constant height mode, the distance between tip 22a and the sample 26 is maintained at a substantially constant average value and the feedback signal derived from the output of analyzers 30 is either not applied to controllers 34 or attenuated to a very low value before it is so applied.

The system 20 of FIG. 1 can be modified by detecting a reflected signal at tip 22a instead of the transmitted signal at assembly 28. In such event, no connection between analyzers 30 and assembly 28 is necessary. The reflected signal is sent back through a coaxial cable 24 to analyzers 30 and can also be used as feedback to piezo controllers 34. Where the sample to be identified or characterized is electrically non-conductive, it is desirable to detect a reflected signal at tip 22a. In the description below of non-destructive identification and characterization of single atoms, molecules or surface features in the sample, system 20 may be operated in a transmission mode to detect the transmitted signal at assembly 28 or in a reflection mode to detect the reflected signal at tip 22a. For a more detailed description of the reflection mode, see U.S. Pat. No. 5,281,814.

Spectroscopic Mode

In order to measure spectra of a substance to be characterized, the incident photon energies are tuned through the range of interest while the emitted radiation or tunneling current modulation is monitored for features in the difference frequency spectrum. Any atom or molecule or surface feature can be studied by this method on a conducting, semiconducting or superconducting surface using a standard (DC) STM. Adsorbate or surface features could be studied on insulating surfaces as well by using an ACSTM in the reflection mode as described below.

STM as Detection Device

FIG. 2 is a schematic diagram of the portion 29 of the ACSTM 20 of FIG. 1 and a laser 1 and an optional laser 2 to illustrate the preferred embodiment of the invention. Both lasers 1 and 2 preferably emit monochromatic light with frequencies that can be tuned substantially continuously (i.e. without significant gaps in the spectrum) through a desired frequency spectrum; dye lasers may be used for such purpose.

When the lasers are tuned to sweep across a range of desired frequencies, the spectrum/network analyzers 30 are used to monitor the tunneling current either through assemblies 28 in the transmission mode or the signal at tip 22a in the reflection mode described above. For stability, it may be desirable to operate the ACSTM 20 in a constant height mode as described above.

FIGS. 3 and 4 are energy level diagrams illustrating the operation of the systems of FIGS. 1 and 2 where both lasers 1 and 2 are used. In such event, both lasers may be tuned to sweep through desired ranges of frequencies. In reference to FIG. 3, the solid lines 50, 52 are the actual energy levels of a substance such as an atom, a molecule or a local surface feature (such as a surface vacancy or substitutional defect) to be characterized. The energy levels 50, 52 may represent electronic energy states so that the levels represent different energy states of electrons of the atom, molecule or surface feature. Energy levels 50, 52 may also represent vibrational or rotational features where these energy levels correspond to different vibrational or orientational states of the molecule or surface feature. Thus the difference in energy between levels 50, 52 is $E_{trans}$ and the energies of lasers 1 and 2 are both substantially $E_{ph}$, where the virtual energy level corresponding to the energy $E_{ph}$ from level 52 is shown in dotted line 54 in FIG. 3. The difference between the energy of the photons of laser 1 and the transition energy between levels 50, 52 is shown as the difference energy $E_{diff}$. The frequency of laser 2 differs slightly from that of laser 1; such difference is too small to be shown in the scale of the energy level diagram of FIG. 3.

In operation, both lasers 1 and 2 are tuned to simultaneously increasing or decreasing frequencies to maintain the frequencies of the two lasers to be slightly different. In other words, the magnitude of $E_{ph}$ is changed continuously, for example, from level 62 to 64 by increasing the frequencies of the two lasers, as shown in FIG. 3, or by deceasing the frequencies of the two lasers, from level 64 to 62. Then when the energy $E_{ph}$ is at a value close to but not exactly at level 50, such as when it is at 54, enhanced radiation emission is observed due to the transition of the substance to be characterized between energy levels 52 and 50. Such enhanced radiation emission can be in the microwave frequency range. Such radiation modulates the tunneling current between the tip 22a of the ACSTM and sample 26 in the transmission mode, or the current at tip 22a in the reflection mode.

The photons from laser 1 could have excited the substance in the sample to transit from energy level 52 to energy level 50 and the photons from laser 2 could have induced the substance in the excited state at energy level 50 to fall back down to energy level 52, emitting a photon of energy $E_{trans}$ as well as microwaves with energy $E_{diff}$. Such microwaves would modulate the current in the ACSTM 20 which can then be detected by analyzers 30. The values of $E_{ph}$ and $E_{diff}$ can then be used to characterize the atom, molecule or surface feature of the sample.

In the case of certain molecules or molecular complexes, when a substance in the excited state 50 is caused to emit photons, the substance may return to a different vibrational or rotational state 52' rather than the original unexcited state 52, as shown in FIG. 4. The substance at energy level 52' may then fall from state 52' back to the original unexcited state 52, emitting microwave transition energy $E_{trans}$ as shown in FIG. 4. Such microwave transition energy $E_{trans}$ will modulate the signal at tip 22a in the ACSTM 20 and can be detected and measured by analyzers 30 at the same time as the detection and measurement of microwave energy $E_{diff}$, since analyzers 30 are capable of measuring simultaneously the amplitudes of the current or voltage at tip 22a at different frequencies over a range of frequencies in the spectrum.

While only two lasers are shown in FIG. 2, it will be understood that more than two lasers may be used for simultaneously detecting and measuring more than one energy level transitions and are within the scope of the invention. Although the excitation and emission of a single photon is discussed above to illustrate the invention, it will be understood that the sample can be excited to emit multiple photons. Such variations are within the scope of the invention.

While the use of two lasers as illustrated in FIGS. 3 and 4 is desirable, in some circumstances it is adequate to use a single laser as shown in FIG. 5. In such event, the substance in the excited state 50 will fall back to the unexcited state 52 by imparting energy to its surroundings.

STM as Microwave Source

Instead of using the STM 20 as a detecting device, it can instead be used to supply microwaves at one or more frequencies to the sample which acts as a mixer where the energy of the photons from a laser and a microwave energy interact as shown in the scheme of FIG. 6. The energy of the photon from the laser and n microwave photons from the STM combine according to the following equation to cause the substance in the sample to transit to an excited state of energy $E_{trans}$, where n is a positive integer:

$$E_{trans} = E_{ph} \pm nE_{\mu wave}$$

Thus in reference to FIGS. 1 and 6, microwave sweep oscillator 21 may supply an AC signal at one or more frequencies to tip 22a in order to supply microwaves of one or more frequencies towards the portion of the surface of sample 26 that is illuminated by laser 1. The frequencies of both laser 1 and of the ACSTM signal may be tuned until enhanced photon emission is observed from the portion of sample 26 that is illuminated by the laser as illustrated in FIG. 7. As before, the frequency of laser 1 is increased or decreased continuously over an energy range from energy level 52 to between energies 62 and 64. The frequencies of the microwaves supplied by the ACSTM may be maintained substantially constant or can also be tuned along with the laser frequency. When the energy $E_{ph}$ of the laser is tuned to "excite" virtual energy level 54, and when the energy corresponding to one of the frequencies of the microwaves supplied by ACSTM 20 is $E_{diff}$ as shown in FIG. 7, the substance is caused to transit from an unexcited energy level 52 to excited state 50 and to fall back down to the unexcited state 52 by emitting photons. Such photons are observed by means of an optical instrument 70 which detects and measures the energy $E_{trans}$ of photon emission to characterize the substance in sample 26. A shield 80 placed between the tip 22a of the ACSTM 22 and the laser 1, as shown in FIG. 6, reduces any extraneous signals and noise in the ACSTM measurements.

In the preferred embodiment, optical instrument 70 may comprise a filter 72 and/or a spectrometer 74 of which only a portion is shown in FIG. 6. Where there are multiple transitions between a plurality of energy levels so that photons of different energies and frequencies are emitted instead of at a signal frequency, it is desirable for instrument 70 to include a diffraction or other dispersing device (not shown) for separating photons of different frequencies and charge coupled devices or other multiplexed detectors for detecting the photon emissions at different energies simultaneously. Other types of optical detectors that may be used in instrument 70 include photodiodes or photomultiplier tubes in instrument 70, or dispersion devices such as gratings, interferometers and filters. In order to prevent the functions of the ACSTM from being affected by the laser, a shield 48 can be employed.

Analytical Mode

If the difference frequency characteristics of an atom, molecule or surface feature are known, either from sources unrelated to this invention or by spectroscopy as described above, then the instruments described above can be used to detect the presence of such atoms, molecules or surface features. If the STM is used as a measurement device as shown in FIG. 2, then the one or more lasers are tuned to emit photons of energies $E_{ph}$ that are close to but not at the known transition energy $E_{trans}$. The sample is then scanned and analyzers 30 would then detect the presence or absence of enhanced microwave emission at energy $E_{diff}$ in order to detect the presence of the atoms, molecules or surface features. The scanning may be accomplished simply by moving either the laser or lasers and tip 22a on the one hand, or more simply by moving the sample 26. This can be accomplished simply by applying the appropriate voltages to piezoelectric translators which control the sample position.

Where it is desirable to move the tip 22a instead of the sample in the scanning, it may be adequate to move the tip only without moving the laser, since the spot-size of lasers are typically of the size of at least tens of microns, whereas the scanning range of tip 22a of the ACSTM is typically at most up to several microns. Hence, even if the tip is moved, it would still be measuring a portion of the surface of sample 26 illuminated by the laser. The tip 22a may be moved in a manner similar to that described above for moving sample 26.

Where the ACSTM 20 is used to supply microwave energy as shown in FIG. 6, both laser 1 and oscillator 21 of the ACSTM are optimized to detect the transition energy to photon emission $E_{trans}$ as shown in FIG. 7, such as by setting the laser energy to a value close to but slightly different from $E_{trans}$ in FIG. 7, and the microwave energy to $E_{diff}'$ or $E_{diff}'/n$ where n is a non-zero integer. $E_{diff}'$ or $E_{diff}'/n$ may correspond to microwave frequencies in a range of about 0 to 30 GHz.

While in many applications, optimization of the laser frequency or frequencies and/or microwave frequency or frequencies means that these frequencies are set to values in order to maximize the enhanced radiation signal of the atom, molecule or surface feature to be detected, in some situations, it may be that contrast between detection of two different features is desired. In such situations, the optimum settings might be the set of frequencies for which the difference between the two features is maximized. In other words, the optimum settings in such case may be obtained as follows. The laser frequency or frequencies and/or the microwave frequency or frequencies may be set to maximize the enhanced signal from one feature and at the same time to minimize the signal from the second feature. Then in the second measurement, the frequencies are set to maximize the detection of enhanced signal from the second feature and to minimize the signal return from the first feature. Still other optimization settings may be for which the signal-to-noise ratio of the difference frequency is maximized. Optimization is based on considerations such as detection efficiency, detector sensitivity and background signals.

One possible application of the aspect of this invention contemplates a combination of spectroscopic and analytical modes, where the spectra of the individual reactants and product species on a catalyst surface is first measured. For example, carbon monoxide is reacted with oxygen catalytically to convert it to carbon dioxide. A catalyst for this reaction might commonly be insulating alumina ($Al_2O_3$) with separated platinum or other metal particles on it. The sample would not be conducting, so that the STM should employ an AC signal in the measurement in the transmission mode or reflection mode. The spectra of the adsorbed molecules would be recorded by scanning the lasers and looking for enhancements in the microwave difference frequency as described above in reference to FIGS. 2–5. One way to do this would be to record the spectra using analyzers 30 with each of the known adsorbates present, but only one at a time. Visible/ultraviolet lasers may be used in the scheme to measure electronic features and infrared lasers may be used to measure vibrational or rotational features of the adsorbate. Vibrational and/or rotational features give not only fingerprint information of the chemical identities of the species under study, but such features relate directly to bond strengths. They indicate chemical changes in molecules due to their specific chemical environment. Electronic features give a broader view that can also be useful in chemical identification. At high resolution, vibrational and even rotational features can appear in visible/UV spectra. After these spectra are worked out, the analytical mode is used to map the locations or the various reactants and products and intermediaries at different locations on the catalyst under various conditions.

Another possible application is the detection of a sugar molecule adhering to the walls of a cell. Once again, one of the spectroscopic modes could be used to find a feature characteristic of the sugar molecule. Then, the analytical mode could be used to map the presence of the sugar(s) with respect to various features on the cell.

In the analytical mode, where microwave radiation of a particular energy is expected, instruments other than spectrum or network analyzers may also be used, such as lock-in amplifiers. The use of STM for measuring the microwave frequencies is advantageous since the detection is localized to the immediate vicinity of the STM tip so that single atoms, molecules or small surface features can be characterized or detected.

From the above, it is seen that the objective of the invention has been achieved. Not only can single atoms, molecules or small surface features be characterized in the spectroscopic mode and detected in the analytical mode, but such techniques can also be applied to small parts of a large molecule. Many such spectra pieced together could then be used to determine a molecular structure or the structure of molecular complex, such as a drug molecule bonded to its target site on the protein. These spectra would have the additional advantage of determining the intra-molecular or inter-molecular binding mechanism if vibrational spectroscopic information was obtained.

The use of lasers in the infrared, visible and ultraviolet energies for spectroscopy and analysis extend the range of energy levels that can be characterized and detected compared to detection in the microwave frequency range alone.

While the invention has been described above by reference to various features of the preferred embodiments, it will be understood that changes and modifications may be made without departing from the scope of the invention which is to be limited only by the appended claims.

What is claimed is:

1. A method for determining one or more energy levels of an atom, molecule or surface feature, comprising the steps of:
    directing at least one laser beam at a surface where said atom, molecule or surface feature is located;
    placing the tip of a scanning tunneling microscope in the vicinity of the surface;
    tuning the frequency of the at least one laser beam through a range of frequencies; and
    monitoring an enhancement of the difference frequency between the transition energy of said atom, molecule or surface feature and energy of photons in the at least one beam by means of the scanning tunneling microscope.

2. The method of claim 1, wherein said directing step directs two or more lasers at different frequencies at the surface.

3. The method of claim 2, said tuning step tuning the two or more lasers to increase or decrease the frequencies of both laser beams.

4. The method of claim 1, further comprising shielding the tip of the scanning tunneling microscope from the at least one laser beam.

5. The method of claim 1, said monitoring step operating the scanning tunneling microscope in AC mode to measure modulation of current at the tip of the scanning tunneling microscope.

6. The method of claim 5, said monitoring step operating the scanning tunneling microscope in an AC mode to detect microwave frequencies in the range of 1 to 30 Ghz.

7. The method of claim 1, said scanning tunneling microscope having a tip, wherein said monitoring step measures a current signal between the tip and the surface.

8. The method of claim 1, said scanning tunneling microscope having a tip, wherein said monitoring step measures an AC signal reflected towards the tip by the surface.

9. A method for determining one or more energy levels of an atom, molecule or surface feature, comprising the steps of:
    directing a laser beam at a surface where said atom, molecule or surface feature may be located;
    supplying microwaves of one or more frequencies to said surface;
    tuning frequency of the laser beam through a range of frequencies;
    tuning the one or more frequencies of the microwaves through a range of frequencies wherein the frequencies of the laser beam and the microwaves are tuned in reference to one or more energy levels of an atom, molecule or surface feature; and
    detecting photon emission from the surface for determining the one or more energy levels of the atom, molecule or surface feature.

10. The method of claim 9, said supplying step including the steps of:
    placing the tip of a scanning tunneling microscope in the vicinity of the surface; and
    causing the microscope to generate microwaves.

11. The method of claim 9, said supplying step supplies microwaves of frequencies in the range of 1 to 30 GHz.

12. A method for detecting the presence of an atom, molecule or surface feature on a surface, comprising the steps of:
    directing at least one laser beam at the surface;
    placing the tip of a scanning tunneling microscope in the vicinity of the surface;
    monitoring frequency at the tip of the scanning tunneling microscope; and
    optimizing frequency of the at least one laser beam and the frequency of detection of the scanning tunneling microscope, in order to detect at the tip at one or more frequencies that are functions of energy level or levels characteristic of said atom, molecule or surface feature.

13. The method of claim 12, wherein said directing step directs two or more lasers of different frequencies at the surface.

14. The method of claim 13, said optimizing step tuning the two or more lasers to increase or decrease the frequencies of both laser beams.

15. The method of claim 12, further comprising shielding the tip of the scanning tunneling microscope from the laser beam or beams.

16. The method of claim 12, said monitoring step operating the scanning tunneling microscope in an AC mode to measure modulation of current at the tip of the scanning tunneling microscope.

17. The method of claim 16, said monitoring step operating the scanning tunneling microscope in an AC mode to detect microwave frequencies in the range of 1 to 30 GHz.

18. The method of claim 12, said optimizing step optimizing frequency of the at least one laser beam and the frequency of detection of the scanning tunneling microscope to detect at a microwave frequency that is a sum or difference or a combination thereof of frequencies corresponding to energy levels or other energy states of two or more atoms, molecules or surface features, in combination with the frequency of the at least one laser beam.

19. The method of claim 12, further comprising determining one or more energy levels of the atom, molecule or surface feature prior to the directing, placing and optimizing steps.

20. The method of claim 12, said scanning tunneling microscope having a tip, further comprising monitoring an enhancement of the difference frequency between the transition energy of said atom, molecule or surface feature and energy of photons in the at least one beam by means of the scanning tunneling microscope.

21. The method of claim 20, said scanning tunneling microscope having a tip, wherein said monitoring step measures a current signal between the tip and the surface.

22. The method of claim 20, said scanning tunneling microscope having a tip, wherein said monitoring step measures an AC signal reflected towards the tip by the surface.

23. A method for detecting the presence of an atom, molecule or surface feature on a surface, comprising the steps of:
    directing at least one laser beam at a surface where said atom, molecule or surface feature may be located;
    supplying microwaves of one or more frequencies to said surface;
    optimizing the frequency of the at least one laser beam and the frequency or frequencies of detection of the scanning tunneling microscope to detect at one or more frequencies that are functions of energy level or levels characteristic of said atom, molecule or surface feature; and detecting photon emission from the surface for determining presence of said atom, molecule or surface feature.

24. The method of claim 23, said supplying step including the steps of:

placing the tip of a scanning tunneling microscope in the vicinity of the surface; and causing the microscope to generate microwaves.

25. The method of claim 23, said supplying step supplies microwaves of frequencies in the range of 1 to 30 Ghz.

26. The method of claim 23, further comprising determining one or more energy levels of the atom, molecule or surface feature prior to the directing, optimizing and detecting steps.

* * * * *